(12) United States Patent
Hicks et al.

(10) Patent No.: US 11,226,815 B2
(45) Date of Patent: Jan. 18, 2022

(54) USING BIG CODE TO CONSTRUCT CODE CONDITIONAL TRUTH TABLES

(71) Applicant: International Business Machines Corporation, Armonk, NY (US)

(72) Inventors: Andrew C. M. Hicks, Wappingers Falls, NY (US); Michael E. Gildein, Wappingers Falls, NY (US); Daniel Nicolas Gisolfi, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/842,191

(22) Filed: Apr. 7, 2020

(65) Prior Publication Data
US 2021/0311730 A1  Oct. 7, 2021

(51) Int. Cl.
*G06F 8/75* (2018.01)
*G06F 9/445* (2018.01)

(52) U.S. Cl.
CPC ............ *G06F 8/75* (2013.01); *G06F 9/44589* (2013.01)

(58) Field of Classification Search
CPC ............................... G06F 9/44589; G06F 8/75
See application file for complete search history.

(56) References Cited

U.S. PATENT DOCUMENTS

| | | | |
|---|---|---|---|
| 5,046,033 A | | 9/1991 | Andreasen et al. |
| 6,611,945 B1 | | 8/2003 | Narasimhan et al. |
| 7,885,907 B1 | | 2/2011 | Yen et al. |
| 9,378,000 B1 * | 6/2016 | Lee | G06F 8/443 |
| 10,534,604 B1 * | 1/2020 | Kimball | G06F 8/427 |
| 2003/0106049 A1 * | 6/2003 | Ungar | G06F 8/427 717/143 |
| 2008/0028375 A1 * | 1/2008 | Matsa | G06F 40/226 717/141 |
| 2009/0281977 A1 * | 11/2009 | Allen | G06Q 10/10 706/47 |
| 2012/0079463 A1 * | 3/2012 | Freeman | G06F 8/70 717/137 |
| 2013/0268810 A1 * | 10/2013 | Prasad | G06F 11/0751 714/48 |
| 2014/0250443 A1 * | 9/2014 | Greiner | G06F 9/54 719/328 |

(Continued)

OTHER PUBLICATIONS

Wang et al, "Dead Code Detection Method Based on Program Slicing", [online], 2017, [Retrieved from internet on Oct. 14, 2021], pp. 155-158, <https://ieeexplore.ieee.org/stamp/stamp.jsp?tp=&arnumber=8250352>, (Year: 2017).*

(Continued)

*Primary Examiner* — S. Sough
*Assistant Examiner* — Zengpu Wei
(74) *Attorney, Agent, or Firm* — Cantor Colburn LLP; Teddi Maranzano

(57) ABSTRACT

A method of analyzing code is provided. The method includes generating an abstract representation of the code, identifying conditional statements in the abstract representation, populating a truth table for each conditional statement that has been identified with all possible outcomes of the conditional statement and assessing the truth table for each conditional statement to identify issues.

15 Claims, 5 Drawing Sheets

(56) References Cited

U.S. PATENT DOCUMENTS

2020/0026552 A1* 1/2020 Zhang .................. G06F 9/4843

OTHER PUBLICATIONS

Anonymous, "Using Big Code to construct Code Conditional Truth Tables to test its uniqueness and hi-lite redundant areas.", Online retrieved Aug. 9, 2019, URL:<https://ibm.ent.box.com/notes/504778824467>, 2 pages.

* cited by examiner

```
# sample program
a = True
b = True if a:
    print(a)
elif a and b:
    print(b)
```
301

```
tokens = [
'a', '=', 'True', 'b', '=', 'True', 'if', 'a', ':', 'print', '(', 'a', ')', 'elif',
'a', 'and', 'b', ':', 'print', '(', 'b', ')'
]
```
401

```
Block
├── AssignmentStatement
│   ├── a                                501
│   └── True
├── AssignmentStatement
│   ├── b
│   └── True
├── IfStatement
│   ├── Block
│   │   └── PrintStatement
│   │       └── a
│   └── IsEqual
│       ├── a
│       └── True
├── ElifStatement
│   ├── Block
│   │   └── PrintStatement
│   │       └── b
│   ├── IsEqual
│   │   ├── a
│   │   └── True
│   └── IsEqual
│       ├── b
│       └── True
├── VarDecleration
│   ├── a
│   └── boolean
└── VarDecleration
    ├── b
    └── boolean
```

USING BIG CODE TO CONSTRUCT CODE CONDITIONAL TRUTH TABLES

BACKGROUND

The present invention generally relates to software, and more specifically, to the use of big code to construct code conditional truth tables that can be used to test a uniqueness of the code and to high-light redundant portions of the code.

Computer or program code is the set of instructions forming a computer program that is executed by a computer. It is one of two components of the software which runs on computer hardware, the other being the data. Computers can only execute the machine code instructions which are part of their instruction set. Because these instructions are difficult for humans to read, and writing good programs in machine code or other low-level programming languages is a time-consuming task, most programmers write in the source code of a high-level programming language. This source code is translated into machine code by a compiler or interpreter so that the computer can execute it to perform its tasks.

SUMMARY

Embodiments of the present invention are directed to a method of analyzing code. A non-limiting example of the method includes generating an abstract representation of the code, identifying conditional statements in the abstract representation, populating a truth table for each conditional statement that has been identified with all possible outcomes of the conditional statement and assessing the truth table for each conditional statement to identify issues.

Embodiments of the present invention are directed to a method of analyzing code. A non-limiting example of the method includes parsing the code to generate tokens, representing the tokens in a concrete syntax tree (CST), replacing the tokens with abstract terms in the CST to create an abstract syntax tree (AST), traversing the AST in an order of instructions of the code to identify conditional statements in the AST, populating a truth table for each conditional statement that has been identified with all possible outcomes of the conditional statement and assessing the truth table for each conditional statement to identify issues. The assessing is executed by determining, given the order of the instructions of the code, whether a later conditional statement overlaps with an earlier conditional statement and flagging at least one of the later conditional statement and the earlier conditional statement as an issue if the later conditional statement and the earlier conditional statement are both true.

Embodiments of the present invention are directed to a computer program product for analyzing code including a processor and a memory. The memory has executable instructions stored thereon, which, when executed, cause the processor to execute a method. A non-limiting example of the method includes generating an abstract syntax tree (AST) to represent the code, identifying conditional statements in the AST, populating a truth table for each conditional statement that has been identified with all possible outcomes of the conditional statement and assessing the truth table for each conditional statement to identify issues in the code.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a graphical depiction of an abstract syntax tree which is created from the tokens of FIG. 4 in accordance with one or more embodiments of the present invention;

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Software is growing more complex with many compounding packages on frameworks and attempting to create fault-free software is often very difficult.

In any non-trivial program, one must implement conditional decision points. In a perfect world, testing of those programs often requires driving the execution of every possible permutation of paths for each predicate of each conditional decision point. This level of testing is often infeasible and an analysis of the code itself is required. However, in complex software systems, the code and especially the conditional logic can become very convoluted. As the logic segments in complex software systems are coded, re-coded, redesigned and fixed by one or more developers, programmer intent is often lost.

While simple static code analysis methodologies and tools exist to identify unreachable code and check if default cases are omitted, these static tools cannot be used with complex software systems in which coding, re-coding, redesigning and fixes are being executed concurrently.

Therefore, one or more embodiments of the present invention provide systems and methods for breaking down each conditional decision point in a code, such as a switch case or an if-else segment. The conditional decision points are first broken down into a full truth for each variable predicate. Subsequently, the conditional decision points are broken down into a full truth table for the combinations of each predicate. Logic statements covered and situations not covered by the existing code can be fully constructed in the truth table. Situations and code, such as in the case of omissions or redundancies, can be then identified that are most likely incorrect due to the developer not fully understanding a problem or all possible permutations.

Figure 1:
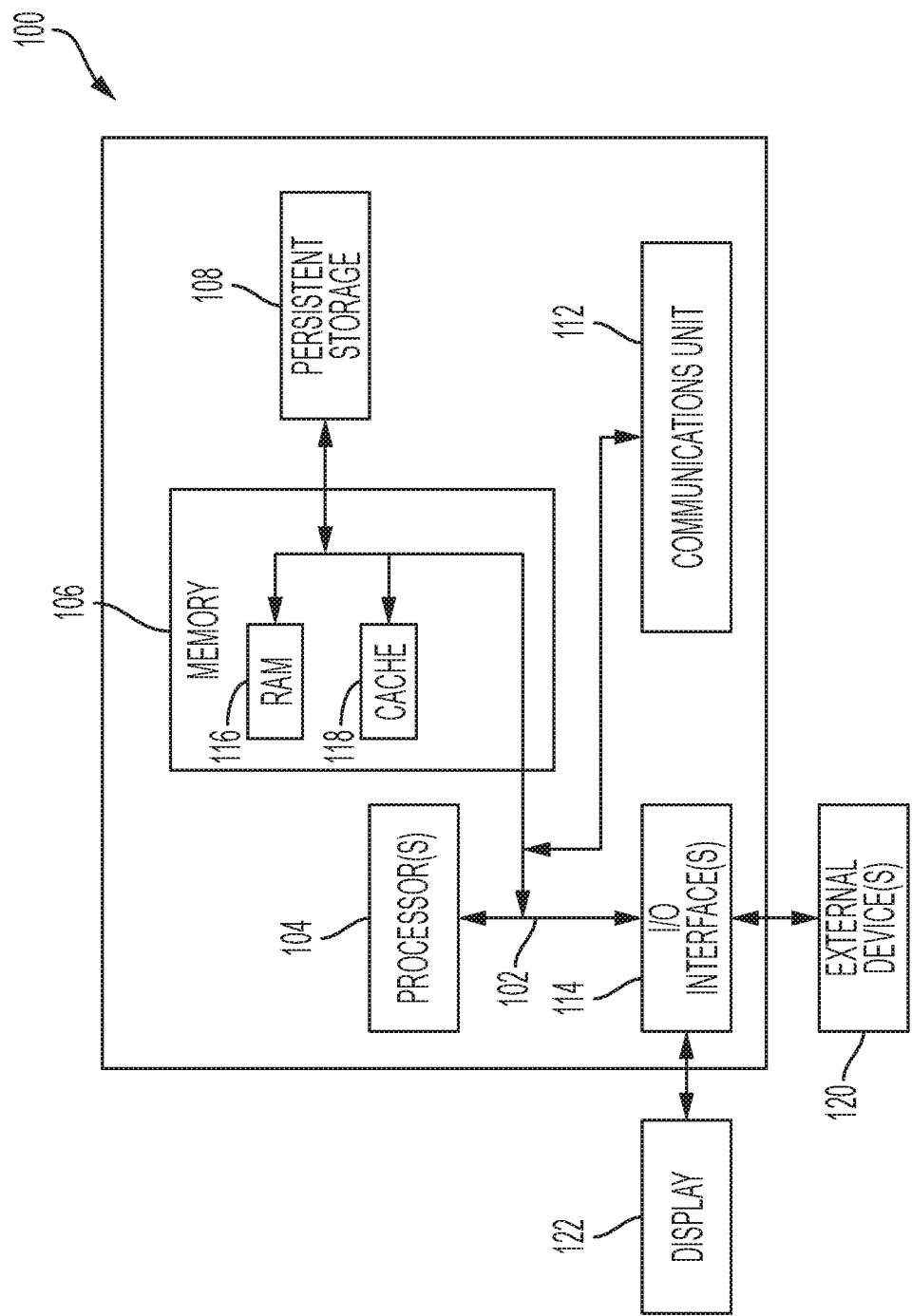
FIG. 1 depicts a block diagram of components of a computer in accordance with one or more embodiments of the present invention.

Turning now to FIG. 1, components of a computer 100 are provided in accordance with one or more embodiments of the present invention. It should be appreciated that FIG. 1 provides only an illustration of one implementation and does not imply any limitations with regard to the environments in which different embodiments may be implemented. Many modifications to the depicted environment may be made.

As depicted, the computer 100 includes communications bus 102, which provides communications between computer processor(s) 104, memory 106, persistent storage 108, communications unit 112 and input/output (I/O) interface(s) 114. Communications bus 102 can be implemented with any architecture designed for passing data and/or control information between processors (such as microprocessors, communications and network processors, etc.), system memory, peripheral devices and any other hardware components within a system. Communications bus 102 can be provided as one or more communications buses 102.

The memory 106 and persistent storage 108 are computer-readable storage media. The memory 106 includes random access memory (RAM) 116 and cache memory 118. In general, the memory 106 can include any suitable volatile or non-volatile computer-readable storage media.

One or more programs may be stored in persistent storage 108 for access and/or execution by one or more of the respective computer processors 104 via one or more memories of memory 106. The persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory or any other computer-readable storage media that is capable of storing program instructions or digital information.

The media used by persistent storage 108 may also be removable. For example, a removable hard drive may be used for persistent storage 108. Other examples include optical and magnetic disks, thumb drives and smart cards that are inserted into a drive for transfer onto another computer-readable storage medium that is also part of persistent storage 108.

The communications unit 112 provides for communications with other data processing systems or devices and includes one or more network interface cards. The communications unit 112 may provide communications through the use of either or both physical and wireless communications links.

The I/O interface(s) 114 allows for input and output of data with other devices that may be connected to computer 100. For example, I/O interface 114 may provide a connection to external devices 120 such as a keyboard, keypad, a touch screen and/or some other suitable input device. The external devices 120 can also include portable computer-readable storage media such as, for example, thumb drives, portable optical or magnetic disks and memory cards. Software and data used to practice one or more embodiments of the present invention can be stored on such portable computer-readable storage media and can be loaded onto persistent storage 108 via the I/O interface(s) 114. The I/O interface(s) 114 can also connect to a display 122 which provides a mechanism to display data to a user and may be, for example, a computer monitor.

Figures 2, 3, 4:
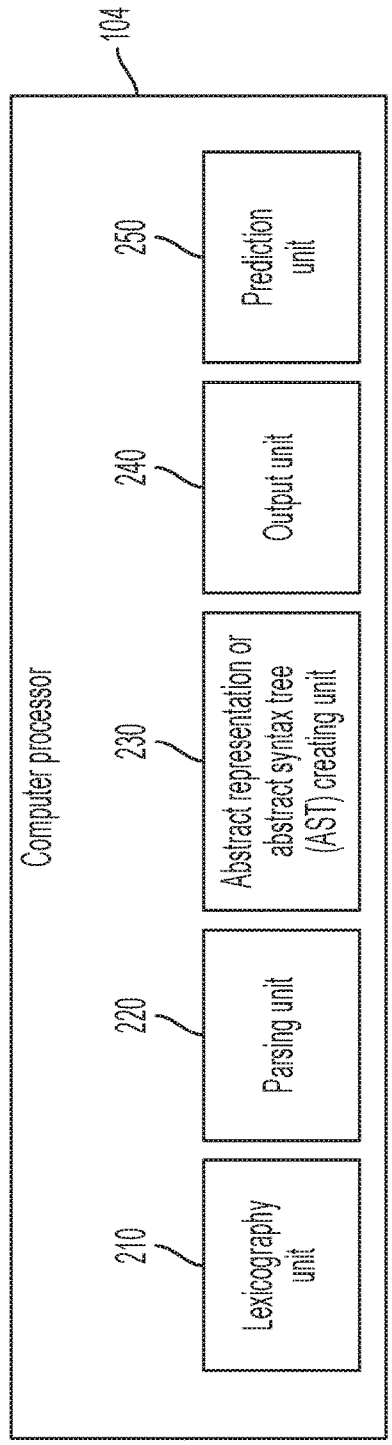
FIG. 2 is a schematic diagram of components of a computer processor of the computer of FIG. 1 in accordance with one or more embodiments of the present invention.
FIG. 3 is a section of a stream of code which is receivable by a lexicography unit of a computer processor in accordance with one or more embodiments of the present invention.
FIG. 4 is a graphical depiction of tokens that can be generated from the section of the stream of code of FIG. 3 in accordance with one or more embodiments of the present invention.

With reference to FIG. 2, the persistent storage 108 can have executable instructions stored thereon which are readable and executable by the computer processors 104. When the executable instructions are read and executed by the computer processors 104, the executable instructions cause the computer processors 104 to operate as a lexicography unit 210, a parsing unit 220, an abstract representation creating unit (hereinafter referred to as an "abstract syntax tree (AST) creating unit") 230, an output unit 240 and a prediction unit 250.

The lexicography unit 210, the parsing unit 220, the AST creating unit 230, the output unit 240 and the prediction unit 250 cooperatively allow for a breaking down of each conditional phrase that is found in a stream of user code (see below), such as a select statement, a switch statement, an if-else segment or a ternary operator, into a full truth for each variable predicate and subsequently a full truth table for the combinations of each predicate. This allows for a full deconstruction of the logic statements covered in the stream of user code and the situations not covered by the stream of user code. Situations and code, such as in the case of omissions or redundancies, can be then identified that are most likely incorrect due to the developer(s) of the stream of user code not fully understanding the problem the stream of user code is trying to address or all possible permutations of each of the conditionals.

. . .

if (A) { } else if (B) { } else if (C) { } else if (A & B & D & E & C) { }//Infeasible code that will never execute but would be identified by Conditional Truth Table Expansion else { }

. . .

In the example above, A and B represent boolean variables. If the first conditional, namely if A is true, passes then the second conditional, if A and B are both true, will not be reached. That is, there can be a case in which if the first conditional is false, then the second conditional will be reached but the code in the second conditional will never be executed and is redundant.

In the proposed solution, the redundancies in a stream of user code will be clearly identified and highlighted based on the results of a conditional truth table expansion. Thus, for the following stream of user code:

. . .

if A:

reachable else if A and B:

unreachable, therefore redundant

. . .

The following Table 1 illustrates the conditional truth table expansion:

TABLE 1

| A | B | A ˆ B |
|---|---|---|
| T | T | T |
| F | F | F |
| F | T | F |
| T | F | F |

By using the conditional truth table expansion, it is possible to see the logic behind the programmers reasoning and it is evident that the conditional truth table expansion aids in revealing logical truths and in avoiding the creation of impossible conditional statements of code (e.g., the first row, where A is true and B is true so that AAB can never be reached).

With reference to FIGS. 3 and 4, operations of lexical analysis by the lexicography unit 210 is illustrated. As shown in FIG. 3, the lexicography unit 210 is initially fed a stream of user code 301 that viewed and parsed in the lexicography unit 210. Each character is viewed within the context of the other characters to generate tokens 401 (see FIG. 4). As shown in FIG. 4, the tokens 401 are predetermined and are used to ensure that the user code is valid. The collection of these tokens 401 generates a grammar set.

After the user code 301 has been validated and the respective tokens 401 have been created, the parsing unit 220 generates a concrete representation (hereinafter referred to as "a concrete syntax tree (CST)"). The CST is a representation of the user code 301 that enables the user code 301 to be easily traversed and thereby provides further context to the tokens 401.

With reference to FIG. 5, the AST creating unit 230 uses the concrete representation or the CST to create an abstract representation or an AST 501 as shown in FIG. 5. This is done in the AST creating unit 230 by removing all language-specific terms in the tokens 401 and replacing them with abstract terms. For example, since many programming languages differ from one another regarding which tokens 401 are assigned what values (i.e., Pascal may use:= and another language may use the standard= to denote an assignment), the AST creating unit 230 simplifies the language-specific terms to a generic value. This generic value can be referred to as an "AssignmentStatement" and allows for a disassociation of language dependencies and effectively encourages comparisons between vastly different grammar sets.

The output unit 240 populates a conditional truth table for each conditional statement in the AST 501 so that all possible outcomes of a given statement can be viewed, considered and analyzed. Thus, for the "if a" statement in the AST 501, the output unit 240 generates the conditional truth table shown in Table 2 below:

TABLE 2

| A |
|---|
| True |
| False |

Meanwhile, for the "elif a and b" statement in the AST 501, the output unit 240 generates the conditional truth table shown in Table 3 (which is similar to Table 1) below:

TABLE 3

| A | B | A ˆ B |
|---|---|---|
| True | True | True |
| False | True | False |
| False | False | False |
| True | False | False |

In the example provided above, it can be seen that there is an overlap in the first row when A is true and A and B are also true. Using this observation, prediction unit 250 can estimate where there may be "unreachable" code regions in the stream of user code (i.e., code that will never run based on their logical construction). For example, when A is true, the first conditional will be triggered before reaching the second which could also have been true. With this foresight, the prediction unit 250 can flag this and all other similar locations in the stream of code and point out these key areas from which redundancies can be removed.

Figure 6:
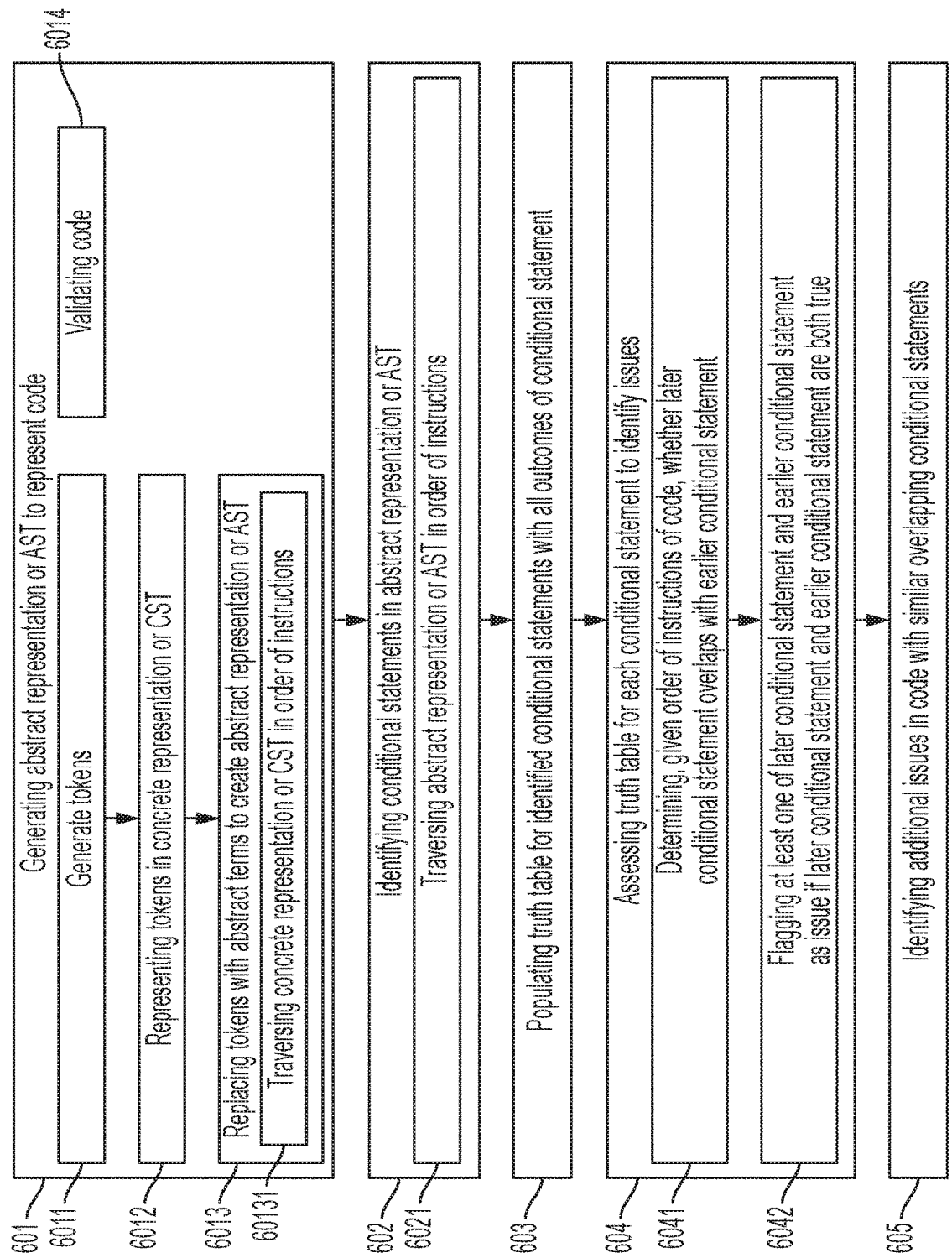
FIG. 6 is a flow diagram illustrating a method of analyzing code in accordance with one or more embodiments of the present invention.

With reference to FIG. 6, a method of analyzing code is provided and includes generating an abstract representation or an AST to represent the code (601), identifying conditional statements in the abstract representation or the AST (602), populating a truth table for each conditional statement that has been identified with all possible outcomes of the conditional statement (603) and assessing the truth table for each conditional statement to identify issues (604). Each conditional statement can include or be provided as one or more of an if-else statement, a select statement, a switch statement and a ternary operator. The method can further include identifying additional issues in the code with similar overlapping conditional statements (605).

The generating of the AST of operation 601 can include parsing a stream of the code to generate tokens (6011), representing the tokens in a concrete representation or a CST (6012) and replacing the tokens with abstract terms in the concrete representation or the CST to create the abstract representation or the AST (6013) as well as an operation of validating the stream of the code using the tokens (6014). In any case, each token can include or be provided as a language-specific token (e.g., ":=" or "=") and each abstract term can include or be provided as a generic value (e.g., "AssignmentStatement"). The replacing of the tokens with the abstract terms of operation 6013 can include traversing the concrete representation or the CST in an order of instructions of the stream of the code (60131). The identifying of the conditional statements in the abstract representation or the AST of operation 602 can include traversing the abstract representation or the AST in an order of instructions of the code (6021). The assessing of the truth table for each conditional statement of operation of operation 604 can include determining, given the order of the instructions of the code, whether a later conditional statement overlaps with an earlier conditional statement (6041) and flagging at least one of the later conditional statement and the earlier conditional statement as an issue if the later conditional statement and the earlier conditional statement are both true (6042).

Figure 7:
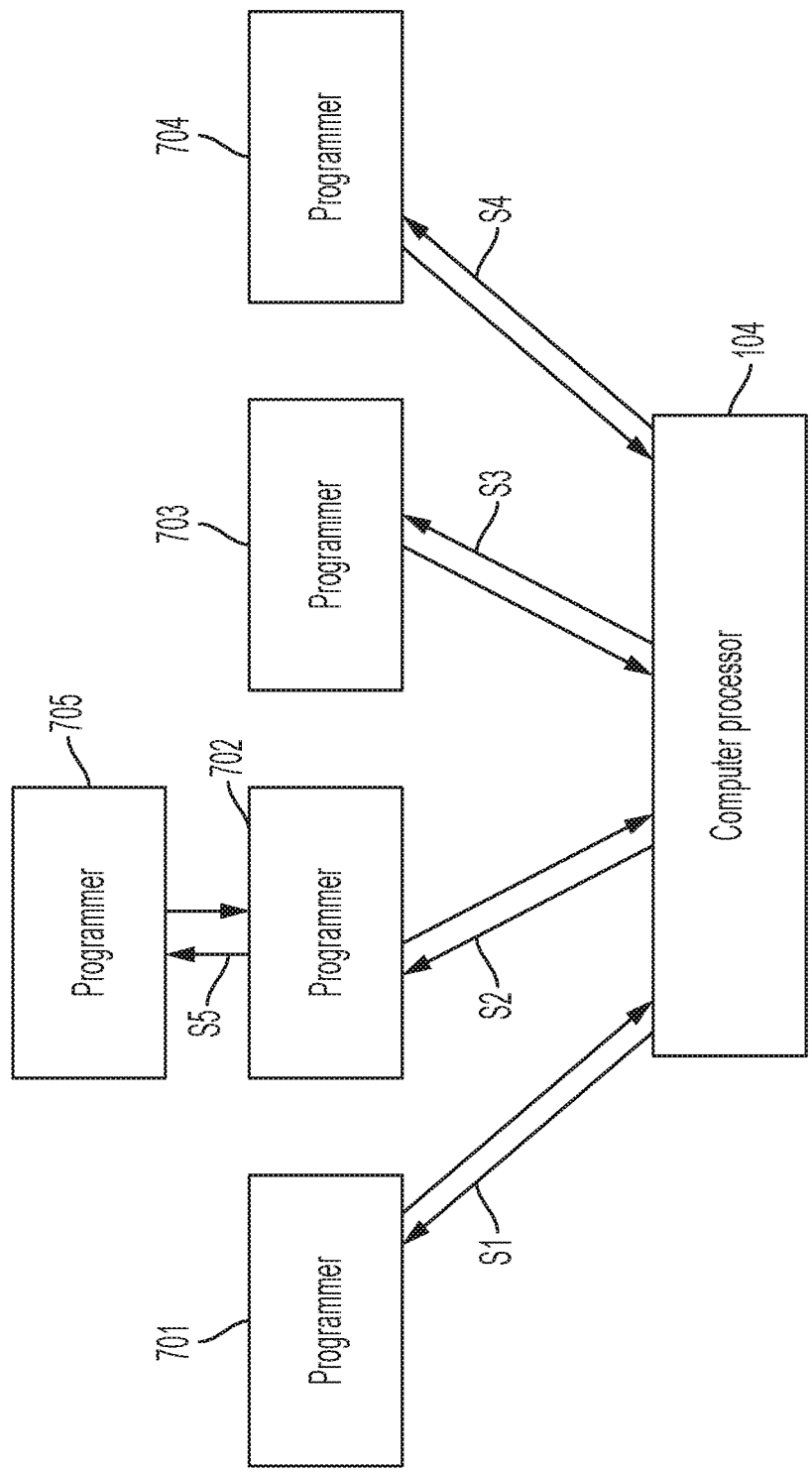
FIG. 7 is a schematic depiction of communications between programmers and a computer processor in accordance with one or more embodiments of the present invention.

With reference to FIG. 7, in an operational setting in which multiple programmers 701-705 are responsible for generating code, the computer processor 104 of FIG. 1 can be receptive of code from each programmer 701-705 in parallel as in the cases of programmers 701, 702, 703 and 704 or in series as in the case of programmers 705 and 702. In these or other similar cases, it is to be understood that the programmers 701-705 can work on similar sections of the code or on completely different sections of the code. In any of these situations, it is to be further understood that the programmers 701-705 can produce various types of redundancies in the code. These redundancies can manifest as later conditional statements that overlap with earlier conditional statements in the code when an order to the instructions of the code is considered. Where the computer processor 104 operates as described herein, the computer processor 104 can be receptive of the code from each of the programmers 701-705 and can analyze the code to identify the issues therein. The computer processor 104 can then issues signals S1-S5 back to one or more of the programmers 701-705 (in parallel or serially) in order to highlight those issues for the programmers 701-705 to address.

In particular, where the programmers 701-705 are responsible for similar sections of the code, the computer processor 104 can signal the programmers 701-705 as a group. Alternatively, where some of the programmers (i.e., programmers 705 and 702) are working on a different section of the code from programmers 701, 703 and 704, the computer processor 104 can signal programmers 705 and 702 separately to alert them of a type of code sequencing that might be problematic based on the analysis of the sections of the code worked on by programmers 701, 703 and 704.

In accordance with one or more further embodiments of the present invention, the computer processor 104 can also generate proposed changes to the code so as to address and potentially correct the identified issues. In these or other similar cases, the computer processor 104 can include these proposed changes in the signals S1-S5 in a format corresponding to the format of the code in the abstract representation or the AST 501 (i.e., including the abstracted terms) and/or in a format corresponding to the original language of the code. In the latter case, the computer processor 104 would generate the proposed changes to the code by reverse engineering the proposed changes to the code through the prediction unit 250, the output unit 240, the AST creating unit 230, the parsing unit 220 and the lexicography unit 210.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of analyzing redundancies in code in an operational setting in which multiple programmers are responsible for generating the code, the method comprising:
receiving, in a processor, sections of the code from a first portion of each of the multiple programmers in parallel and from a second portion of each of the multiple programmers in series; and
analyzing the code, by the processor, the executing comprising:
generating an abstract representation of the code;
identifying conditional statements in the abstract representation;
populating a truth table for each conditional statement that has been identified with all possible outcomes of the conditional statement; and
assessing, in a prediction unit of the processor, the truth table for each conditional statement to identify issues, wherein:
the issues that are identified in the truth table for each conditional statement by the prediction unit of the processor comprise instances in which unreachable code regions are present in the code,
the unreachable code regions are defined as the regions of the code that will never run based on a logical construction of earlier and later conditional statements,
the analyzing the code, by the processor, further comprises issuing signals comprising proposed changes to the code to address and correct an issue separately to the first portion of each of the multiple programmers and the second portion of each of the multiple programmers to highlight the issue, and
the populating of the truth table comprises populating a first column with an identifier of the earlier conditional statement and possible outcomes of the earlier conditional statement, populating a second column with an identifier of the later conditional statement and possible outcomes of the later conditional statement and populating a third column with an identifier of a combination of the earlier and later conditional statements and possible outcomes of the combination of the earlier and later conditional statements.

2. The method according to claim 1, wherein the generating of the abstract representation comprises:
parsing the code to generate tokens;
representing the tokens in a concrete representation; and
replacing the tokens with abstract terms in the concrete representation to create the abstract representation.

3. The method according to claim 2, wherein each token comprises a language-specific token and each abstract term comprises a generic value.

4. The method according to claim 2, wherein the replacing of the tokens with the abstract terms comprises traversing the concrete representation in an order of instructions of a stream of the code.

5. The method according to claim 1, wherein each conditional statement comprises one or more of an if-else statement, a select statement, a switch statement and a ternary operator.

6. The method according to claim 1, wherein the identifying of the conditional statements in the abstract representation comprises traversing the abstract representation in an order of instructions of the code, and the assessing of the truth table for each conditional statement comprises:
determining, given the order of the instructions of the code, whether a later conditional statement overlaps with an earlier conditional statement as evidenced by corresponding entries in the first, second and third columns; and
flagging at least one of the later conditional statement and the earlier conditional statement as an issue if the later conditional statement and the earlier conditional statement are both true such that the later conditional statement is one of the unreachable code regions in the code.

7. The method according to claim 6, further comprising identifying additional issues in the code with similar overlapping conditional statements.

8. A system for analyzing redundancies in code in an operational setting in which multiple programmers are responsible for generating the code, the computer program product comprising:
a processor, which is receptive of sections of the code from a first portion of each of the multiple programmers in parallel and from a second portion of each of the programmers in series; and
a memory, the memory having executable instructions stored thereon, which, when executed, cause the processor to execute a method of analyzing the code comprising:
generating an abstract syntax tree (AST) to represent the code;
identifying conditional statements in the AST;
populating a truth table for each conditional statement that has been identified with all possible outcomes of the conditional statement; and
assessing, by the processor in a prediction unit of the processor, the truth table for each conditional statement to identify issues in the code,
wherein:
the issues in the code that are identified in the truth table for each conditional statement by the prediction unit of the processor comprise instances in which unreachable code regions are present in the code,
the unreachable code regions are defined as the regions of the code that will never run based on a logical construction of earlier and later conditional statements,
the method of analyzing the code, by the processor, further comprises issuing signals comprising proposed changes to the code to address and correct the issues separately to the first portion of each of the multiple programmers and the second portion of each of the multiple programmers to highlight the issue, and
the populating of the truth table comprises populating a first column with an identifier of the earlier conditional statement and possible outcomes of the earlier conditional statement, populating a second column with an identifier of the later conditional statement and possible outcomes of the later conditional statement and populating a third column with an identifier of a combination of the earlier and later conditional statements and possible outcomes of the combination of the earlier and later conditional statements.

9. The system according to claim 8, wherein the method further comprises receiving the code as an input by the processor and the processor comprises:
   a lexicography unit configured to parse the code to generate tokens and to validate the code;
   a parsing unit configured to represent the tokens in a concrete syntax tree (CST);
   an AST creating unit to configured to replace the tokens with abstract terms in the CST to create the AST;
   an output unit configured to identify the conditional statements in the AST and to populate the truth table for each conditional statement that has been identified with all the possible outcomes of the conditional statement; and
   the prediction unit configured to assess the truth table for each conditional statement to identify the issues in the code.

10. The system according to claim 8, wherein the generating of the AST comprises:
   parsing the code to generate tokens;
   representing the tokens in a concrete syntax tree (CST); and
   replacing the tokens with abstract terms in the CST to create the AST.

11. The system according to claim 10, wherein each token comprises a language-specific token and each abstract term comprises a generic value.

12. The system according to claim 10, wherein the replacing of the tokens with the abstract terms comprises traversing the CST in an order of instructions of the code.

13. The system according to claim 8, wherein each conditional statement comprises one or more of an if-else statement, a select statement, a switch statement and a ternary operator.

14. The system according to claim 8, wherein:
   the identifying of the conditional statements in the AST comprises traversing the AST in an order of instructions of the code, and
   the assessing of the truth table for each conditional statement comprises:
   determining, given the order of the instructions of the code, whether the later conditional statement overlaps with the earlier conditional statement as evidenced by corresponding entries in the first, second and third columns; and
   flagging at least one of the later conditional statement and the earlier conditional statement as an issue if the later conditional statement and the earlier conditional statement are both true such that the later conditional statement is one of the unreachable code regions in the code.

15. The system according to claim 8, wherein the method further comprises identifying additional issues in the code with similar overlapping conditional statements.

* * * * *